(12) United States Patent
Kim (10) Patent No.: US 7,302,096 B2
(45) Date of Patent: Nov. 27, 2007

(54) METHOD AND APPARATUS FOR LOW DEPTH OF FIELD IMAGE SEGMENTATION

(75) Inventor: Changick Kim, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 852 days.

(21) Appl. No.: 10/412,128

(22) Filed: Apr. 11, 2003

(65) Prior Publication Data

US 2004/0076335 A1 Apr. 22, 2004

Related U.S. Application Data

(60) Provisional application No. 60/451,384, filed on Feb. 28, 2003, provisional application No. 60/419,303, filed on Oct. 17, 2002.

(51) Int. Cl.
G06K 9/34 (2006.01)
G06K 9/42 (2006.01)

(52) U.S. Cl. .................................... 382/173; 382/257

(58) Field of Classification Search ..................... None
See application file for complete search history.

(56) References Cited

U.S. PATENT DOCUMENTS

| | | | |
|---|---|---|---|
| 5,257,182 A * | 10/1993 | Luck et al. | 382/224 |
| 5,524,068 A | 6/1996 | Kacandes et al. | |
| 5,647,025 A | 7/1997 | Frost et al. | |
| 5,848,190 A | 12/1998 | Kleehammer et al. | |
| 5,960,111 A | 9/1999 | Chen et al. | |
| 6,058,209 A * | 5/2000 | Vaidyanathan et al. | 382/203 |
| 6,157,733 A | 12/2000 | Swain | |
| 6,301,385 B1 | 10/2001 | Chen et al. | |
| 6,728,314 B2 * | 4/2004 | Kan et al. | 375/240.12 |
| 6,738,500 B2 * | 5/2004 | Bankman et al. | 382/128 |
| 2002/0141650 A1 | 10/2002 | Keeney et al. | |

FOREIGN PATENT DOCUMENTS

| | | |
|---|---|---|
| JP | 05073627 | 3/1993 |
| JP | 07093561 | 4/1995 |
| JP | 08190634 | 7/1996 |
| JP | 09281386 | 10/1997 |
| WO | WO 98/35318 | 8/1998 |
| WO | WO 98/48381 | 10/1998 |

OTHER PUBLICATIONS

Hippenstiel, Wavelet Denoising of Signal Based on the Fourth Order Moment, Aug. 2001 IEEE.*
James Z. Wang, et al., "Unsupervised Multiresolution Segmentation for Images with Low Depth of Field", IEEE Transactions on Pattern Analysis and Machine Intelligence, vol. 23, No. 1, Jan. 2001, pp. 85-90.
Jia Li, et al., "Multiresolution Object-of-Interest Detection for Images with Low Depth of Field", Proceedings of the International Conference on Image Analysis and Processing, Sep. 1999, pp. 32-37.

* cited by examiner

*Primary Examiner*—Joseph Mancuso
*Assistant Examiner*—Alex Liew (57) ABSTRACT

A method for extracting an object of interest from an image is provided. The method initiates with defining an image feature space based upon frequency information. Then, the image feature space is filtered to smooth both focused regions and defocused regions while maintaining respective boundaries associated with the focused regions and the defocused regions. The filtered image feature space is manipulated by region merging and adaptive thresholding to extract an object-of-interest. A computer readable media, an image capture device and an image searching system are also provided.

22 Claims, 6 Drawing Sheets

Fig. 7-1  Fig. 7-2  Fig. 7-3  Fig. 7-4 series 4 series 3 series 2 series 1 series 5

METHOD AND APPARATUS FOR LOW DEPTH OF FIELD IMAGE SEGMENTATION

CROSS REFERENCE TO RELATED APPLICATIONS

This application claims priority from: (1) U.S. Provisional Patent Application No. 60/419,303, filed Oct. 17, 2002, and entitled "Segmentation of Images with Low Depth-of-Field Using Higher Order Statistics Test and Morphological Filtering by Reconstruction," and (2) U.S. Provisional Patent Application No. 60/451,384, filed Feb. 28, 2003, and entitled "Automatic Segmentation of Low Depth-of-Field Image Using Morphological Filters And Region Merging." Each of these provisional applications is herein incorporated by reference in its entirety for all purposes.

BACKGROUND OF THE INVENTION

1. Field of the Invention

This invention relates generally to digital image technology and more particularly to a method and apparatus for partitioning an image into homogeneous regions.

2. Description of the Related Art

Figure 1A:
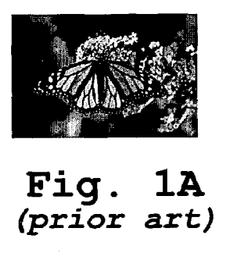
FIGS. 1A through 1C are exemplary illustrations of low DOF images.
Figure 1B:
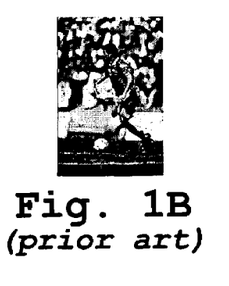
Figure 1C:
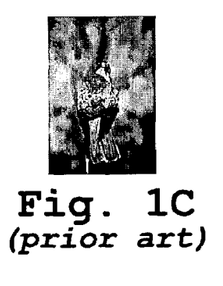

Automatic image segmentation is one of the most challenging problems in computer vision. The objective of image segmentation is to partition an image into homogeneous regions. Depth of Field (DOF) refers to the distance from the nearest to the furthest point of perceived "sharp" focus in a picture. Low DOF is a photographic technique commonly used to assist in understanding depth information within a 2 dimensional photograph. Low DOF generally refers to a condition when an object of interest (OOI) is in sharp focus and the background objects are blurred to out of focus. FIGS. 1A through 1C are exemplary illustrations of low DOF images. The butterfly of FIG. 1A is highly focused, i.e., the object of interest, while the background is defocused. The soccer player and soccer ball of FIG. 1B are the objects of interest, since each is highly focused, while the background is defocused. Similarly, with reference to FIG. 1C, the bird is highly focused while the remainder of the image is defocused. Segmentation of images with low DOF is applicable to numerous applications, e.g., image indexing for content-based retrieval, object-based image compression, video object extraction, 3D microscopic image analysis, and range segmentation for depth estimation.

Assuming sharply focused regions contain adequate high frequency components, it should be possible to distinguish the focused regions from the low DOF image by comparing the amount of the high frequency content. There are two approaches for the segmentation of the low DOF images: edge-based and region-based approaches. The edge-based method extracts the boundary of the object by measuring the amount of defocus at each edge pixel. The edge-based algorithm has demonstrated accuracy for segmenting man-made objects and objects with clear boundary edges. However, this approach often fails to detect boundary edges of the natural object, yielding disconnected boundaries.

On the other hand, the region-based segmentation algorithms rely on the detection of the high frequency areas in the image. Here, a reasonable starting point is to measure the degree of focus of each pixel by computing the high frequency components. To this end, several methods have been used, such as spatial summation of the squared anti-Gaussian (SSAG) function, variance of wavelet coefficients in the high frequency bands, a multi-scale statistical description of high frequency wavelet coefficients, and local variance, etc. Exploiting high frequency components alone often results in errors both in focused and defocused regions. In defocused regions, despite blurring due to the defocusing, there could be busy texture regions in which high frequency components are still strong enough. These regions are prone to be misclassified as focused regions. Conversely, focused regions with nearly constant gray levels may also generate errors in these regions. Thus, relying only on the sharp detail of the OOI can be a limitation for the region-based DOF image segmentation approach. Furthermore, the multi-scale approaches tend to generate jerky boundaries even though refinement algorithms for high resolution classification are incorporated.

Figure 2:
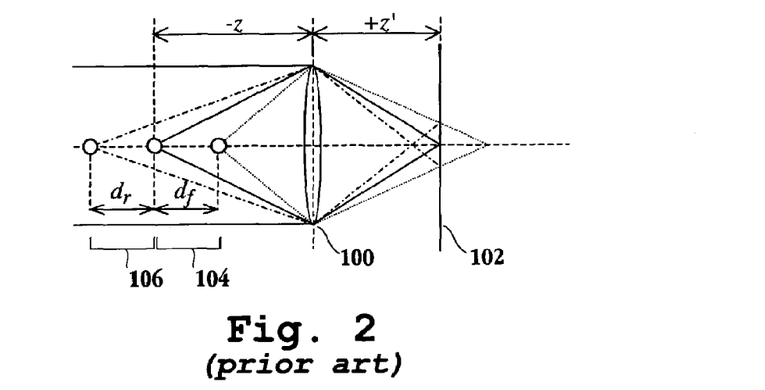
FIG. 2 is a schematic diagram of the optical geometry of a typical image capture device such as a camera.

FIG. 2 is a schematic diagram of the optical geometry of a typical image capture device such as a camera. Lens 100 has the disadvantage that it only brings to focus light from points at a distance-z given by the familiar lens equation:

$$\frac{1}{z'} + \frac{1}{-z} = \frac{1}{f}, \quad (2)$$

where z' is the distance of image plane 102 from lens 100 and f is the focal length. Points at other distances are imaged as little circles. The size of the blur circle can be determined as follows: A point at distance $-\bar{z}$ is imaged at a point $\bar{z}'$ from the lens, where $1/\bar{z}' + 1/-\bar{z} = 1/f$, and so $$(\bar{z}' - z') = \frac{f}{(\bar{z}+f)} \frac{f}{(z+f)} (\bar{z} - z). \quad (3)$$

If image plane 102 is situated to receive correctly focused images of object at distance $-z$, then points at distance $-\bar{z}$ will give rise to blur circles of diameter $$\frac{d}{z'} |\bar{z}' - z'|,$$

where d represents the diameter of lens 100. The depth of field (DOF) is the range of distances over which objects are focused "sufficiently well," in the sense that the diameter of the blur circle is less than the resolution of the imaging device. The DOF depends, of course, on what sensor is used, but in any case it is clear that the larger the lens aperture, the less the DOF. Of course, errors in focusing become more serious when a large aperture is employed. As shown in FIG. 2, $d_f$ 104 and $d_r$ 106 represent the front and rear limits, respectively, of the "depth of field." With low DOF, the diameter of blur circle becomes small, thus only the OOI is in sharp focus, whereas objects in background are blurred to out of focus. Additionally, segmentation techniques based upon color and intensity information suffer from poor extraction results.

As a result, there is a need to solve the problems of the prior art to provide a method and apparatus for segmenting an image associated with a low depth of field such that the object of interest may be extracted from the background accurately and efficiently.

SUMMARY OF THE INVENTION

Broadly speaking, the present invention fills these needs by providing a method and system for transforming the image data to frequency based image data and simplifying the frequency based image data in order to more effectively extract an object of interest (OOI) from the image data. It should be appreciated that the present invention can be implemented in numerous ways, including as a method, a system, computer code or a device. Several inventive embodiments of the present invention are described below.

In one embodiment, a method for partitioning image data is provided. The method initiates with defining an image feature space based upon frequency information. Then, the data of the image feature space is simplified by morphological tools. Next, a region of the filtered image feature space is assigned as an initial object of interest. Here, the region is referred to as a seed region which is associated with the highest value assigned to regions of the filtered image feature space. Each of the regions of the filtered image space is associated with a substantially constant frequency level. Then, the boundary of the initial OOI of the filtered image feature space is updated through a region merging technique. Adaptive thresholding is then conducted to determine a size of the initial object of interest relative to an image data size.

In another embodiment, a method of image segmentation is provided. The method initiates with generating a higher order statistic (HOS) map from image data. Then, the HOS map is simplified. Next, a boundary associated with a focused region of the modified HOS map is determined. Then a final segmentation of the focused region is determined through adaptive thresholding.

In yet another embodiment, a method for extracting an object of interest from an image is provided. The method initiates with defining an image feature space based upon frequency information. Then, the image feature space is filtered to smooth both focused regions and defocused regions while maintaining respective boundaries associated with the focused regions and the defocused regions.

In still yet another embodiment, a computer readable medium having program instructions for image segmentation is provided. The computer readable medium includes program instructions for generating a higher order statistic (HOS) map from image data. Program instructions for modifying the HOS map are included. Program instructions for determining a boundary associated with a focused region of the modified HOS map are provided. Program instructions for determining a final segmentation of the focused region based upon a size of a value associated with the focused region relative to an image data size are also included.

In another embodiment, an image capture device is provided. The image capture device includes a lens configured to focus objects within a depth of field (DOF). An image recording assembly is included with the image capture device. The image recording assembly is configured to generate a digital image including the objects within the DOF from image information received through the lens. The image recording assembly is capable of generating a higher order statistic (HOS) map of the digital image in order to extract the objects within the DOF from the digital image.

In yet another embodiment, an image searching system is provided. The image searching system includes an image capture device having a lens configured to focus objects within a depth of field (DOF). An image extraction assembly in communication with the image capture device is included. The image extraction assembly is configured to extract the objects within the DOF. An image content retrieval system in communication with the image extraction assembly is included. The image content retrieval system is configured to receive data corresponding to the objects within the DOF. The image content retrieval system is further configured to identify a match between the OOIs of the received data and gathered image data.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIGS. 6-1 through 6-4 provide four series of experimental results for each of the steps associated with the segmentation technique of the embodiments described herein.

FIGS. 7-1 through 7-4 illustrate four series of images enabling the comparison of results of existing segmentation techniques with the results generated by the application of the embodiments described herein.

DETAILED DESCRIPTION OF THE PREFERRED EMBODIMENTS

An invention is described for a system, apparatus and method for extracting an object of interest (OOI) from a low depth of field (DOF) image. It will be apparent, however, to one skilled in the art, in light of the following description, that the present invention may be practiced without some or all of these specific details. In other instances, well known process operations have not been described in detail in order not to unnecessarily obscure the present invention. FIGS. 1A-C and 2 are described in the "Background of the Invention" section. The term about as used to herein refers to +/−10% of the referenced value.

The embodiments of the present invention provide a method and a system for separating sharply focused objects of interest (OOI) associated with a low depth of field (DOF)

image from other foreground or background objects in the image. Thus, an image having a low DOF may be partitioned into a focused region and a defocused region. The frequency information associated with the image data is used to partition the image rather than the color or intensity information. Unlike intensity or color image segmentation, in which regions are discovered using properties of the intensity, texture or color, focus cue may play the most important role for the automatic extraction of the focused OOI. The low DOF image is transformed into the appropriate feature space for the segmentation. In one embodiment, the transformation to the appropriate feature space is accomplished by computing higher order statistics (HOS) for all pixels in the low DOF image to generate a HOS map. The HOS map is then simplified, i.e., modified, through morphological filtering by reconstruction as described below. The boundaries of the OOI are defined and updated through region merging. Then, the final OOI is determined through adaptive thresholding. Thus, an accurate extraction of the OOI associated with the low DOF image data is provided for a host of applications.

In order to model defocusing of a focused image, blurring effect by defocusing has been often described by a 2-D Gaussian function:

$$G_\sigma(x, y) = \frac{1}{2\pi\sigma^2} \exp\left(-\frac{x^2 + y^2}{2\sigma^2}\right) \quad (1)$$

where $\sigma$ is a filter scale or spread parameter which controls the amount of defocusing. Thus, a defocused image $I_d(x,y)$ can be modeled as the linear convolution of a focused image $I_f(x,y)$ and a Gaussian function $G_\sigma(x,y)$:

$$I_d(x,y) = G_\sigma(x,y) * I_f(x,y). \quad (4)$$

As shown in Equation (4), since the defocused image is low pass filtered, high frequency components in the image are removed or reduced. Assuming sharply focused regions contain adequate high frequency components, it should be possible to distinguish the focused regions from the low DOF image by comparing the amount of the high frequency content.

Let R represent a set of pixels, R={(k,l); 1≤k≤K, 1≤l≤L}, where the image size is K×L. The goal is to partition R into sharply focused objects-of-interest (OOI), which will be denoted by OOI, and remaining regions, expressed by OOI$^c$.

Let P={R$_i$, i∈{1, . . . ,N}} denote a partition of R. The OOI of an image is defined as follows:

$$OOI = \bigcup_{i=1}^{N_{ooi}} R_i. \quad (5)$$

where R$_i$ is the i-th connected region and N$_{ooi}$ denotes the number of regions belonging to OOI. In other words, OOI represents the focused objects of interest, composed of N$_{ooi}$ regions of P. Equation (5) naturally allows for the definition of multiple OOIs, i.e., OOI can be composed of separated sub-OOIs.

An initial step towards segmentation consists of transforming the input low DOF image, I, into the most appropriate feature space. It should be appreciated that the choice of the feature space may depend on the application that the segmentation algorithm is aimed at. For instance, the feature space may represent the set of wavelet coefficients, or local variance image field.

In one embodiment, higher order statistics (HOS) is applied for feature space transformation. More specifically, the fourth-order moments are calculated for all pixels in the image. It should be appreciated that the fourth order moments have an ability to suppress Gaussian noise, thereby enhancing the ultimate accuracy of the extraction of an OOI. The fourth-order moment at (x,y) is defined as follows:

$$\hat{m}^{(4)}(x, y) = \frac{1}{N_\eta} \sum_{(s,t)\in\eta(x,y)} (I(s, t) - \hat{m}(x, y))^4 \quad (6)$$

where $\eta(i,j)$ is a set of pixels centering at (i,j), $\hat{m}(x,y)$ is the sample mean of $I(x,y)$ $$\left(\text{i.e., } \hat{m}(x, y) = \frac{1}{N_\eta} \sum_{(s,t)\in\eta(x,y)} I(s, t)\right),$$

and N$_\eta$ is a size of $\eta$. Since the dynamic range of the fourth-order moment values is extremely large, the value for each pixel is down scaled and limited by 255 such that each pixel takes a value from [0, 255]. The outcome image is called a HOS map and it is defined as:

$$HOS(x,y) = \min(255, \hat{m}^{(4)}(x,y)/100). \quad (7)$$

Applying Equation (7) for all pixels, results in a HOS map, O={HOS(x,y);(x,y)∈R}.

Figure 3A:
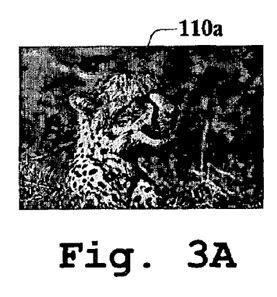
FIGS. 3A-C represent an original image and associated image feature spaces illustrating the effectiveness of the application of higher order statistics in accordance with one embodiment of the invention.
Figure 3B:
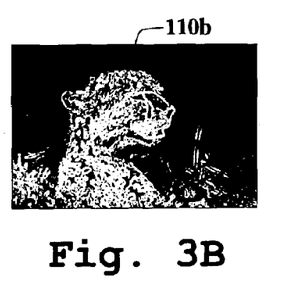
Figure 3C:
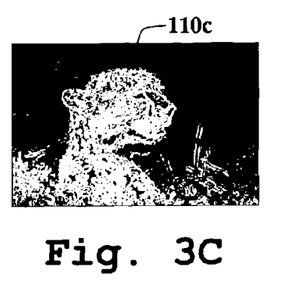

FIGS. 3A-C represent an original image and associated image feature spaces illustrating the effectiveness of the application of higher order statistics in accordance with one embodiment of the invention. FIG. 3C illustrates a HOS map generated as described herein from the low DOF image depicted in FIG. 3A. Comparing it to local variance map shown in FIG. 3B, it can be seen that the HOS map of FIG. 3C yields denser and higher values in the focused areas while suppressing noise in the defocused regions. That is, OOI 110c is illustrated as having a more distinct solid white area than image 110b.

It should be appreciated that the feature space transformation described above, i.e., the application of a HOS calculation to define a HOS map, enables the definition of a more adequate feature space to eventually be exploited for image segmentation. In one embodiment, the HOS map transformed from the low DOF image has gray levels from 0 to 255. A higher value within the 0-255 range corresponds to a higher potential for focused regions. Since focused smooth regions are not as well detected by the HOS calculation, while some defocused regions may generate noise, a proper tool for HOS map modification is needed to remove small dark and bright patches in both focused and defocused regions, respectively.

Mathematical morphology is well known as an approach for smoothing noisy gray-level images by a determined composition of opening and closing with a given structuring element. A number of morphological tools rely on two basic sets of transformations known as erosion and dilation. Let B denote a window or flat structuring element and let B$_{x,y}$ be the translation of B so that its origin is located at (x,y). Then, the erosion $\varepsilon_B(O)$ of a HOS map O by the structuring element B is used in constructing a morphological filter for image simplification $$\varepsilon_B(O)(x, y) = \min_{(k,l) \in B_{x,y}} HOS(k, l). \quad (8)$$

Similarly, the dilation $$\delta_B(O)(x, y) = \max_{(k,l) \in B_{x,y}} HOS(k, l). \quad (9)$$

Elementary erosions and dilations allow the definition of morphological filters such as morphological opening and closing:

Morphological opening, $\gamma_B(O)$ and closing, $\phi_B(O)$ are given by $$\gamma_B(O) = \delta_B(\varepsilon_B(O)),$$

$$\phi_B(O) = \varepsilon_B(\delta_B(O)) \quad (10)$$

The morphological opening operator $\gamma_B(O)$ applies an erosion $\varepsilon_B(\cdot)$ followed by a dilation $\delta_B(\cdot)$ Erosion leads to darker images and dilation to brighter images. A morphological opening (or closing) simplifies the original signal by removing the bright (or dark) components that do not fit within the structuring element B. Thus, morphological operators can be directly applied to binary image without any change.

One feature of the morphological filters is that the filters do not allow for a perfect preservation of the boundary information of an object. Accordingly, this may be a drawback in some instances. To overcome this drawback, filters by reconstruction may be employed. Although similar in nature to morphological opening and closing filters, the filters by reconstruction rely on different erosion and dilation operators, making their definitions slightly more complicated. The elementary geodesic erosion $\varepsilon^{(1)}(O, O_R)$ of size one of the original image O with respect to the reference image $O_R$ is defined as:

$$\varepsilon^{(1)}(O, O_R)(x,y) = \max\{\varepsilon_B(O)(x,y), O_R(x,y)\}, \quad (11)$$

and the dual geodesic dilation $\delta^{(1)}(O, O_R)$ of O with respect to $O_R$ is given by:

$$\delta^{(1)}(O, O_R)(x,y) = \min\{\delta_B(O)(x,y), O_R(x,y)\}. \quad (12)$$

Thus, the geodesic dilation $\delta^{(1)}(O, O_R)$ dilates the image O using the classical dilation operator $\delta_B(O)$. Dilated gray values are greater than or equal to the original values in O. However, geodesic dilation limits these to the corresponding gray values of R, the reference image, as discussed below.

Geodesic erosions and dilations of arbitrary size are obtained by iterating the elementary versions $\varepsilon^{(1)}(O, O_R)$ and $\delta^{(1)}(O, O_R)$ accordingly. For example, the geodesic erosion (dilation) of infinite size, which is so-called reconstruction by erosion (by dilation) is given by the following:

Reconstruction by Erosion:

$$\phi^{(rec)}(O, O_R) = \varepsilon^{(\infty)}(O, O_R) = \varepsilon^{(1)} \circ \varepsilon^{(1)} \circ \ldots \circ \varepsilon^{(1)}(O, O_R) \quad (13)$$

Reconstruction by Dilation:

$$\gamma^{(rec)}(O, O_R) = \delta^{(\infty)}(O, O_R) = \delta^{(1)} \circ \delta^{(1)} \circ \ldots \circ \delta^{(1)}(O, O_R) \quad (14)$$

It should be appreciated that both $\phi^{(rec)}(O, O_R)$ and $\gamma^{(rec)}(O, O_R)$ will reach stability after a certain number of iterations. The two simplification filters, morphological opening by reconstruction, $\gamma^{(rec)}(\varepsilon_B(O), O)$ and morphological closing by reconstruction, $\phi^{(rec)}(\delta_B(O), O)$, may be thought of as merely special cases of $\gamma^{(rec)}(O, O_R)$ and $\phi^{(rec)}(O, O_R)$ in one embodiment.

Similar to morphological opening, morphological opening by reconstruction first applies the basic erosion operator $\varepsilon_B(O)$ to eliminate bright components that do not fit within the structuring element B. However, instead of applying just a basic dilation afterwards, the contours of components that have not been completely removed are restored by the reconstruction by dilation operator $\gamma^{(rec)}(\bullet, \bullet)$ The reconstruction is accomplished by choosing O as the reference image R, which guarantees that for each pixel the resulting gray-level will not be higher than that in the original image O.

In one embodiment of the schemes described herein, morphological closing-opening by reconstruction is applied to the HOS map as a simplification tool. It should be appreciated that one strength of the morphological closing-opening by reconstruction filter is that it fills small dark holes and removes small bright isolated patches, while perfectly preserving other components and their contours. Of course, the size of removed components depends on the size of the structuring element.

Figures 4A, 4B, 4C, 4D:
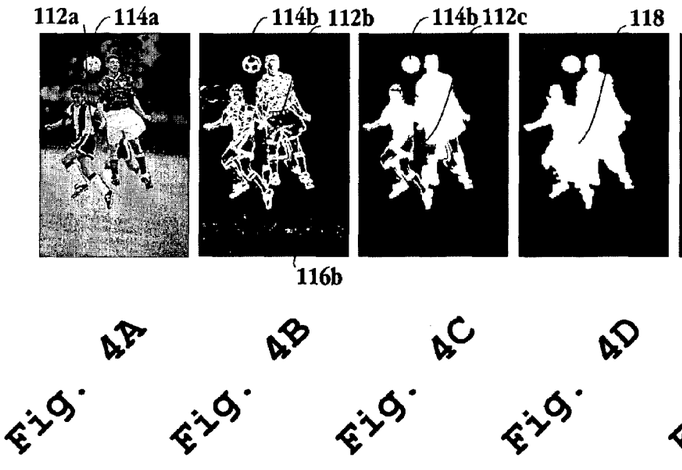
FIGS. 4A-4E represent a pictorial illustration of the HOS map (4B) of a low DOF image (4A), the application of the morphological filters by reconstruction to the HOS map (4C), the result of the application of region merging (4D) and the result of the application of adaptive thresholding (4E) in accordance with one embodiment of the invention.
Figure 4E:
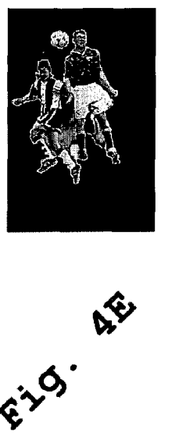

FIGS. 4A-4C represent a pictorial illustration of the HOS map of a low DOF image and the application of the morphological filters by reconstruction to the HOS map in accordance with one embodiment of the invention. FIGS. 4D and 4E are explained further below. FIG. 4A is an exemplary low DOF image. FIG. 4B is the resulting HOS map generated by calculating a HOS for each pixel value of the image data of FIG. 4A. As can be seen, FIG. 4B includes dark patches within the object of interest, which is defined as the two soccer players and soccer ball 114a. Additionally bright patches exist in the defocused region, such as bright patches in region 116b. Through the simplification of the HOS map, e.g., applying morphological filters by reconstruction to the HOS map of FIG. 4B, the small dark patches within the focused region are removed. That is FIG. 4C represents a simplified HOS map, where the simplification is achieved through the application of morphological filters by reconstruction as described above. For example, soccer ball 114c does not include the dark patches of soccer ball 114b. Likewise, the small bright patches in the defocused region are removed when comparing FIG. 4C to FIG. 4B. Accordingly, as shown in FIG. 4C, the focused smooth regions are well covered while the scattered small regions are removed by the filter.

For a typical morphological segmentation technique, which focuses on partitioning an image or scene into homogeneous regions in terms of intensity, the simplification by morphological filter may be followed by marker extraction and watershed algorithm. The marker extraction step selects initial regions, for example, by identifying large regions of constant gray level obtained in the simplification step, where the simplification step may be the application of the morphological filters discussed above. After marker extraction, a large number of pixels are not assigned to any region. These pixels correspond to uncertainty areas mainly concentrated around the contours of the regions. Assigning these pixels to a given region can be viewed as a decision process that precisely defines the partition or segment. One morphological decision tool is the watershed algorithm, which labels pixels in a similar fashion to region growing techniques.

Unlike the conventional intensity-based segmentation focusing on partition of the image, the task of the low DOF image segmentation is to extract a focused region (i.e., OOI) from the image. Similar focused regions may be merged by using seed regions, which are highly probable regions of OOI as described below.

In one embodiment, every flat zone is initially treated as a region regardless of size, which means even one pixel zone may become a region. Then, it is assumed that regions associated with the highest value belong to an initial OOI, while regions having values from 0 through $T_L$ belong to initial $OOI^c$. With reference to FIG. 4C, the simplified HOS map usually contains uncertainty regions, e.g., region 112c, with values v, $T_L<v<255$, which are assigned to either OOI or $OOI^c$. One skilled in the art will appreciate that OOI refers to an object of interest, while OOI is a reference for mathematical expressions. Such an assignment updates the OOI and may be conducted by using bordering information between uncertainty region and current OOI, $OOI_n$ (i.e., OOI in the nth iteration). Therefore, an algorithm that assigns an ith uncertainty region $R_{n,i}$ in the nth iteration to $OOI_n$ by computing normalized overlapped boundary (nob) performs this function as discussed below.

Given an partition $P_n$, the normalized overlapped boundary (nob) between ith uncertain region $R_{n,i} \in P_n$ and the $OOI_n$, is given by $$nob_{n,i} = \frac{\text{cardinal}(BR_{n,i} \cap OOI_n)}{\text{cardinal}(BR_{n,i})}, \quad (15)$$

where the set of boundary pixels of $R_{n,i}$ is defined as $$BR_{n,i} = \left\{ x \notin R_{n,i} \,\middle|\, \min_{r \in R_{n,i}} \|r - x\| \leq T_b \right\}.$$

It should be appreciated that Equation 15 yields a value of zero when the uncertainty region $R_{n,i}$ is not adjacent to $OOI_n$ and a value of one when the $R_{n,i}$ is perfectly enclosed by $OOI_n$'s boundary pixels. Accordingly, a value between 0 and 1 may be used to decide for the assignment of the uncertainty regions in $P_n$ to either $OOI_n$ or $OOI_n^c$ in one embodiment of the invention. The threshold value, $T_b$ for defining boundary pixels of a region is simply set to be 1 in another embodiment of the invention. Obviously, the uncertainty region $R_{n,i} \in P_n$ belongs to either $OOI_n$ or any other regions. In hypothesis-testing terms, $$H_0: R_{n,i} \subseteq OOI_n; \quad H_1: o^c. \quad (16)$$

The normalized overlapped boundary (nob) may be modeled as a continuous random variable nob (random variable should be in bold), taking values of nob in [0, 1]. If $nob_{n,i}$ is larger than a threshold value, the region $R_{n,i}$ is merged to $OOI_n$. Then, the partition $P_n$ and $OOI_n$ are updated, yielding an increasing sequence of $OOI_n$ and eventually converging to OOI. In one embodiment, a starting point for finding the threshold value $T_{nob}$ is calculated by the likelihood ratio test as follows (It should be appreciated that the iteration index n has been dropped in order to simplify the notation.):

Assign $R_i$ to ooi if $P(ooi|nob_i) > P(ooi^c|nob_i)$; otherwise assign to $ooi^c$.

where ooi represents the class for the OOI with prior probability P(ooi), and $ooi^c$ denotes the class for the non-OOI with prior probability $P(ooi^c)=1-P(ooi)$. $P(ooi|nob_i)$ and $P(ooi^c|nob_i)$ represents the a posteriori conditional probabilities that correspond to $H_0$ and $H_1$, respectively. If Bayes theorem is applied on both sides of the expression and the terms are rearranged as shown below:

$$\frac{p(nob_i | ooi)}{p(nob_i | ooi^c)} \underset{H_1}{\overset{H_0}{\gtrless}} \frac{P(ooi^c)}{P(ooi)}, \quad (17)$$

the left-hand ratio is known as the likelihood ratio, and the entire equation is often referred to as the likelihood ratio test. Since the test is based on choosing the region class with maximum a posteriori probability, the decision criterion is called the maximum a posteriori (MAP) criterion. The decision criterion may also be referred to as the minimum error criterion, since on the average, this criterion yields the minimum number of incorrect decisions. Furthermore, as the object of interest and background may have any size and shape, equal priors may be assumed, i.e., $(P(ooi)=P(ooi^c))$, and thus, the expression reduces to the maximum likelihood (ML) criterion:

$$\frac{p(nob_i | ooi)}{p(nob_i | ooi^c)} \underset{H_1}{\overset{H_0}{\gtrless}} 1. \quad (18)$$

Modeling the class-conditional probability density functions by exponential distributions results in:

$$p(nob_i|ooi^c) = \lambda_1 e^{-\lambda_1 nob_i} u(nob_i)$$

$$p(nob_i|ooi) = \lambda_2 e^{-\lambda_2(1-nob_i)} u(1-nob_i) \quad (19)$$

where u(x) denotes the step function. The above distributions approximately model the real data: $p(nob_i|ooi)$ would have high values around $nob_i=1$ and rapidly decay as $nob_i \to 0$, while $p(nob_i|ooi^c)$ would have high values around $nob_i=0$ and rapidly decay as $nob_i \to 1$. Finally, optimal threshold for $nob_i$ can be obtained by rearranging Equations 18 and 19 as depicted below:

$$nob_i \underset{H_1}{\overset{H_0}{\gtrless}} \frac{\lambda_2}{\lambda_1 + \lambda_2} + \frac{\ln(\lambda_1/\lambda_2)}{\lambda_1 + \lambda_2} = T_{nob}. \quad (20)$$

The parameters $\lambda_1$ and $\lambda_2$ can be estimated from the actual data. However, if symmetry between the exponential distributions is assumed ($\lambda_1=\lambda_2$), the expression for the optimal threshold may be approximated and simplified as $$T_{nob} = \frac{\lambda_2}{\lambda_1 + \lambda_2} + \frac{\ln(\lambda_1/\lambda_2)}{\lambda_1 + \lambda_2} \approx \frac{1}{2}. \quad (21)$$

Hence, if $nob_i$ is larger than $T_{nob}$, the $R_i$ is merged to OOI and OOI is updated. This process is iterated until no merging occurs. It should be appreciated that a value of ½ is one exemplary value and the invention is not limited to a value of ½, as any suitable value for $T_{nob}$ may be selected.

Figure 5A:
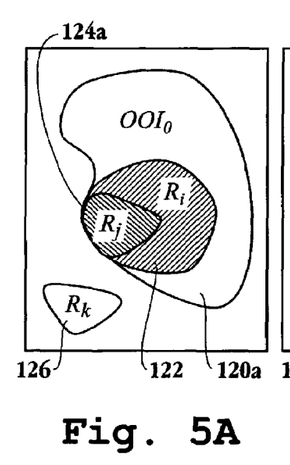
FIGS. 5A-C represent a pictorial illustration of the region merging technique in accordance with one embodiment of the invention.
Figure 5B:
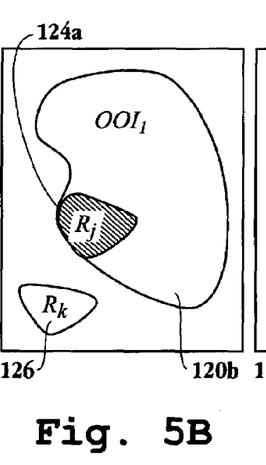
Figure 5C:
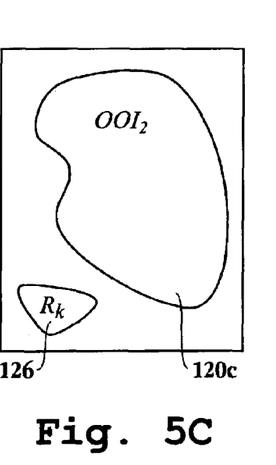

FIGS. 5A-C represent a pictorial illustration of the region merging technique in accordance with one embodiment of the invention. In FIG. 5A, $nob_i$ is greater than $T_{nob}$, thus $R_i$ 122 merges into $OOI_o$, while $R_k$ 126 does not since $nob_k$ is less than $T_{nob}$. In other words, the shared boundary between $R_i$ 122 and $OOI_0$ 120a is greater than ½ of the entire boundary of $R_i$ 122, thereby resulting in the merging of $R_i$ 122 into $OOI_0$ 120a to define $OOI_1$ 120b of FIG. 5B. As the shared boundary between $R_k$ 126 and $OOI_0$ 120a is less than ½, $R_k$ 126 is not merged into $OOI_0$ 120a. As mentioned above, $T_{nob}$ may be any suitable value between 0 and 1, inclusive. In the next iteration, as illustrated in FIG. 5B, $R_j$ 124a merges into $OOI_1$ 120b since $nob_j > T_{nob}$, resulting in $OOI_2$ 120c of FIG. 5C. In order to expedite the process, very small regions can be merged to the neighbor region with the nearest value in advance, in one embodiment of the invention. For example, $R_j$ 124a may be merged into region $R_i$ 122 as an initial step. FIG. 4D illustrates the results of region merging being applied to the simplified HOS map of FIG. 4C. For example, region 112c of FIG. 4C is merged into OOI 118 of FIG. 4D by applying the region merging technique described above.

A final decision of a size associated with the focused region (i.e., OOI) is conducted by adaptive thresholding. The adaptive thresholding decision may be based on the assumption that OOI occupies a reasonable portion of the image. Starting at $T_A=255$, the threshold value is decreased until the size of OOI becomes larger than about 20% of image size. For instance, with reference to FIG. 5C, $R_k$ 126 may not be decided to be as an OOI, since the size of $OOI_2$ 120c is larger than about 20% of the image size. However, if the size of $OOI_2$ 120c is less than about 20% of the image size $R_k$ 126 may be considered a part of the OOI. It should be appreciated that the invention is not limited to a value of 20% of the image size for adaptive thresholding, as any suitable value of the size of the OOI relative to the image size may be selected here. Referring to FIG. 4E, the adaptive thresholding technique may be applied to FIG. 4D, in order to yield the image of FIG. 4E.

The embodiments discussed herein have been implemented and tested on low DOF images selected from the JPEG compressed COREL™ CD-ROM image collection. Color images were first transformed into gray level images for this test. None of the test images had homogeneous defocused regions for this test. A neighborhood of size 3 by 3 for η was used in Equation 6 defined above. The threshold value $T_L$ was set to be 20 in the tests. One skilled in the art will appreciate that one of the most important parameters is the size of the structuring element (SE) of the morphological filter. The size was set to be 31×31 for all experiments except the image shown in FIG. 4A. Since the size of soccer ball 114a shown in FIG. 4A is too small, the ball is removed by the filter when 31×31 of SE is applied. For better subjective result, 21×21 of SE was employed for FIG. 4A only.

FIGS. 6-1 through 6-4 provide four series of experimental results for each of the steps associated with the segmentation technique of the embodiments described herein. The first image of each series is a low DOF image. The second image of each series is a HOS map generated from the respective low DOF image. The third image of each series is a simplified HOS map, where a morphological filter by reconstruction has been applied to each respective HOS map. The fourth image of each series illustrates images that have had region merging applied to the respective simplified HOS map. The fifth image of each series is an image to which adaptive thresholding has been applied to the respective fourth image of each series. Thus, the fifth image represents the extracted OOI resulting from the application of the embodiments described herein.

FIGS. 7-1 through 7-4 illustrate four series of images enabling the comparison of results of segmentation techniques with the results generated by the application of the embodiments described herein. The first image of each series is a low DOF image. The second image of each series illustrates results from the multi-scale approach based on high frequency wavelet coefficients and their statistics. The third image of each series illustrates results from the application of the local variance scheme with Markov Random Field (MRF) model based segmentation. The fourth image of each series illustrates the results from the application the scheme described herein. As demonstrated by the illustrations, the results obtained from the second series of images are blocky due to block-wise initial classification, even though a refinement algorithm for high resolution classification was incorporated. The algorithm utilized for the third image of each series, due to its smoothness constraint adopted in the MRF model, results in adjacent non-OOI regions tending to be connected. The proposed scheme illustrated in the fourth image of each series yields more accurate results over various images with low DOF. For comparison purposes, the fifth image of each series provides a reference generated by human manual segmentation.

The segmentation performance of the proposed algorithm may also be evaluated by using objective criterion. A pixel-based quality measure, which was proposed to evaluate the performances of video object segmentation algorithms may be used to provide the objective criterion. The spatial distortion of the estimated OOI from the reference OOI is defined as $$d(O^{est}, O^{ref}) = \frac{\sum_{(x,y)} O^{est}(x, y) \otimes O^{ref}(x, y)}{\sum_{(x,y)} O^{ref}(x, y)}, \quad (22)$$

where $O^{est}$ and $O^{ref}$ are the estimated and reference binary masks, respectively, and $\otimes$ is the binary "XOR" operation. Table 1 below provides the spatial distortion measures of the results from 1) the variance of wavelet coefficients in the high frequency bands of the second image in each series of FIGS. 7-1 through 7-4, 2) the local variance scheme of the third image in each of the series of FIGS. 7-1 through 7-4, and 3) the proposed scheme represented by the fourth image in each of the series of FIGS. 7-1 through 7-4. Reference maps are obtained by manual segmentation, as shown in respective fifth images of FIGS. 7-1 through 7-4. For the binary "XOR" operation, pixels on OOI are set to be one, otherwise zero. As shown in Table 1, the scheme representing the embodiments described herein has lower distortion measures than those from the other methods and these measure are well matched with subjective evaluation.

TABLE 1

| Image Series | Second image of FIGS. 7-1-4 | Third image of FIGS. 7-1-4 | Fourth image of FIGS. 7-1-4 |
|---|---|---|---|
| 7-1 | 0.1277 | 0.1629 | 0.0354 |
| 7-2 | 0.2872 | 0.4359 | 0.1105 |
| 7-3 | 0.2138 | 0.1236 | 0.1568 |
| 7-4 | 0.3134 | 0.2266 | 0.1709 |

Figure 8:
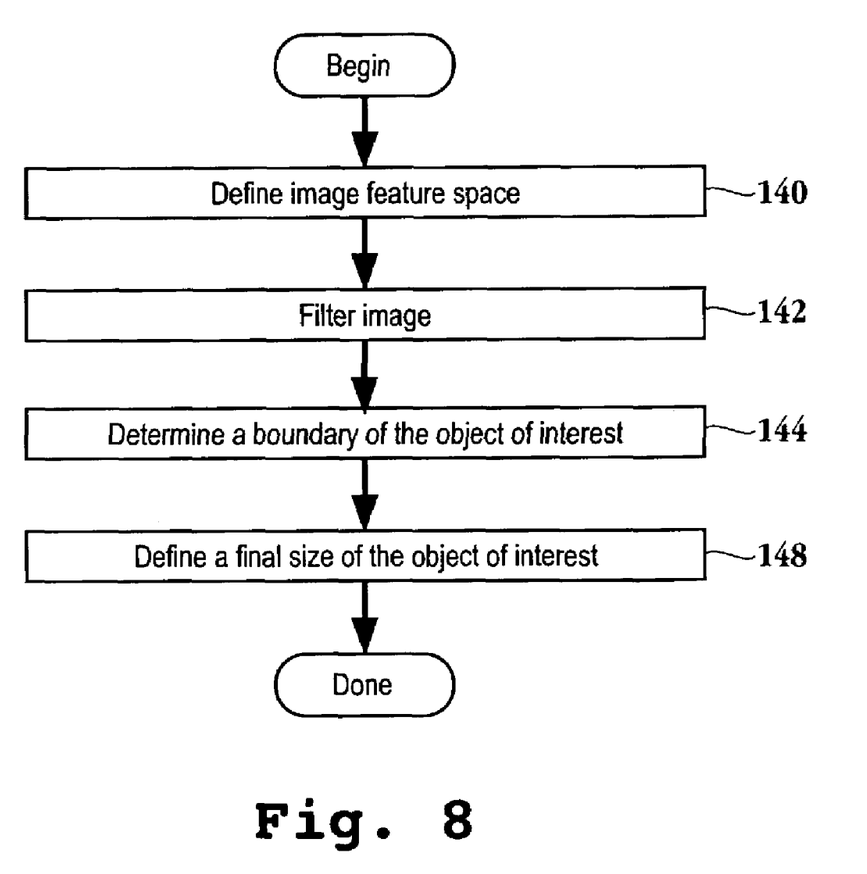
FIG. 8 is a flow chart diagram of the method operations for extracting an object of interest from an image in accordance with one embodiment of the invention.

FIG. 8 is a flow chart diagram of the method operations for extracting an object of interest from an image in accordance with one embodiment of the invention. The method initiates with operation 140. Here, an image feature space is defined. The image feature space is based upon frequency information as described above with reference to higher order HOS being applied to each pixel of an image associated with the image feature space. The method then advances to operation 142 where the image is filtered. Morphological filters by reconstruction are applied to filter the image space in accordance with one embodiment of the invention. As described above, the morphological filters simplify the image space. That is, holes and isolated patches associated with either the focused region or defocused region are removed through the morphological filters as described with reference to FIGS. 4A-4E. In one embodiment, initial OOIs are produced by identifying the interior of homogeneous regions. The areas with the highest values in the simplified HOS map may act as seed regions for the initial OOI. The values are based upon the frequency level of the homogenous region in one embodiment.

The method of FIG. 8 then moves to operation 144 where region merging is performed, i.e., a boundary of the object of interest is determined. First, every flat zone is treated as a region regardless of its size, which means even one pixel zone can become a region. Then, an assumption is made that regions associated with the highest value $v_h$ belong to initial OOI while regions having values from 0 through $T_L$ belong to initial $OOI^c$. For example, in FIG. 4-(c), the simplified HOS map contains uncertainty regions with values ($T_L, v_h$), where $v_h$ is equal to 255. Those uncertainty regions are assigned to either OOI or $OOI^c$. Such assignment is iteratively conducted by considering bordering relationship between uncertainty region and current OOI, $OOI_n$ (i.e., OOI at the nth iteration). In one embodiment, region merging is applied through the calculation of the normalized overlap boundary (nob) as discussed above with reference to FIGS. 5A-5C. The method then proceeds to operation 148 where a final size of the object of interest is defined. Here, adaptive thresholding may be used to determine the final size of the object of interest, as discussed above with reference to FIGS. 4E and 5C. That is, if a size associated with the object of interest is less than a defined percentage of the total image size, then the object of interest is expanded until the size of object of interest achieves the defined percentage. In one embodiment, the defined percentage is about 20% of the total screen size.

Figure 9:
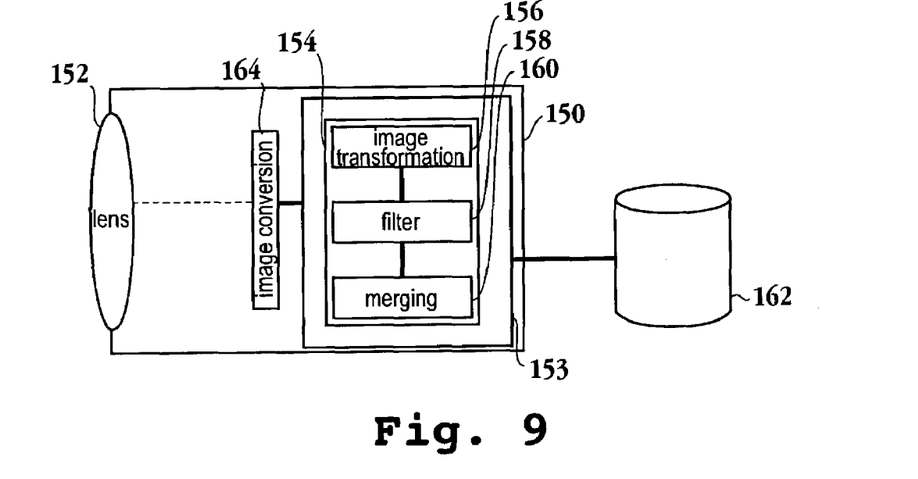
FIG. 9 is a simplified schematic diagram of an image capture device having circuitry configured to extract an object of interest associated with a low depth of field image in accordance with one embodiment of the invention.

FIG. 9 is a simplified schematic diagram of an image capture device having circuitry configured to extract an object of interest associated with a low depth of field image in accordance with one embodiment of the invention. Image capture device 150 includes lens 152 which is capable of focusing on an object of interest. The object of interest and the associated background information is converted to a digital image through conversion block 164. The digital data is then be manipulated in order to extract the object of interest. Here, microprocessor 153, e.g., an application specific integrated circuit, is configured to perform the extraction of the object of interest as described herein.

Microprocessor 153 of FIG. 9 includes image extraction circuitry 154. Image extraction circuitry 154 is made up of image feature transformation circuitry 156 which is configured to generate an HOS map as described above. Filtering circuitry 158 is configured to determine a boundary associated with the objects within the depth of field. Merging circuitry 160 is configured to analyze the frequency information associated with the HOS map to combine related homogeneous regions of the HOS map. Merging circuitry 160 may also include circuitry capable of executing the functionality of described above with reference to adaptive thresholding. Storage media 162 is provided for storage of the extracted object of interest. Of course, the code performing the feature extraction functions and the clustering/meta data generation functions can be hard coded onto a semiconductor chip. One skilled in the art will appreciate that image extraction circuitry 154 can include logic gates configured to provide the functionality discussed above. For example, a hardware description language (HDL) can be employed to synthesize the firmware and the layout of the logic gates for providing the necessary functionality described herein.

Image capture device 150 may be any image capture device, e.g., a microscope, telescope, camera, video camera, etc. It should be appreciated that image extraction circuitry 150 may be integral to image capture device 150 or configured as a plug-in board. Similarly, storage 162 may be included within image capture device 150 or separate. Thus, any microscopic, telescopic, or any low DOF image may be manipulated so that an object of interest may be extracted. It should be further appreciated that the image capture device may be in communication with a general purpose computer capable of extracting an object of interest as described herein.

Figure 10:
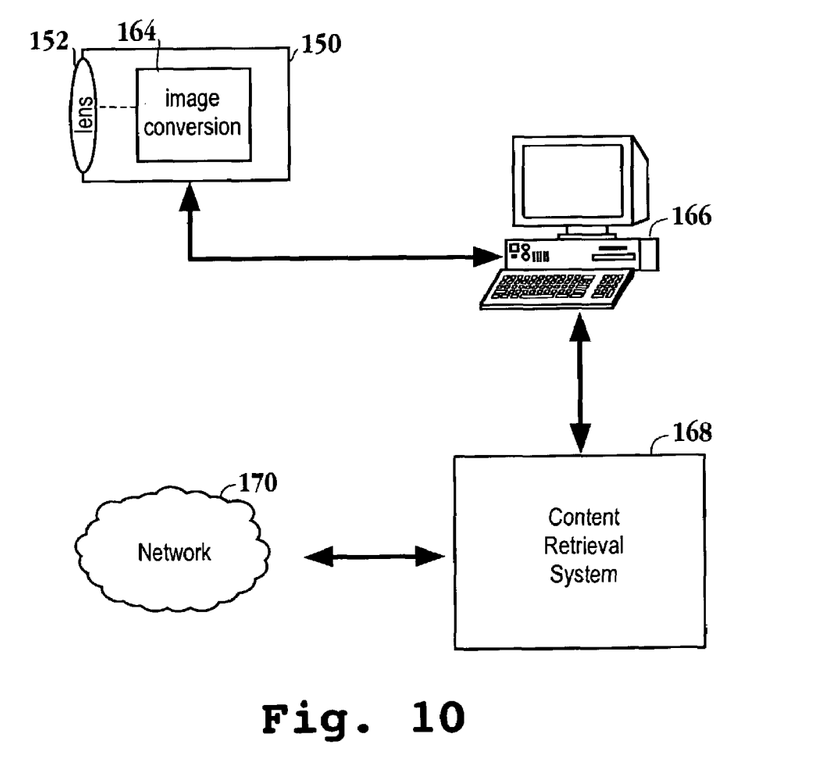
FIG. 10 is a simplified schematic diagram of an image searching system in accordance with one embodiment of the invention.
Figure 61:
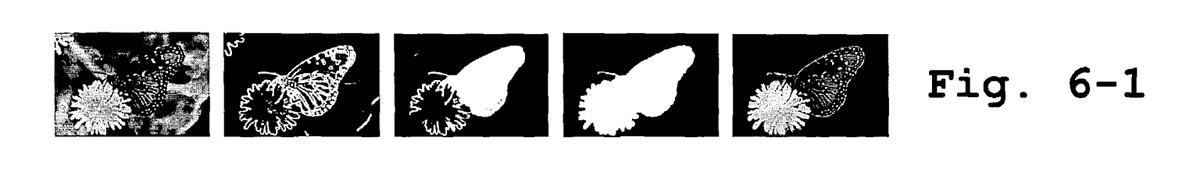
Figure 62:
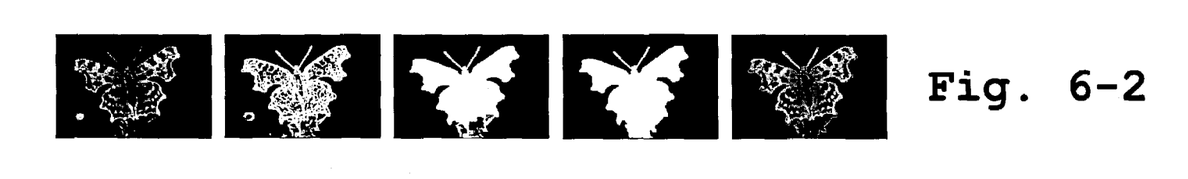
Figure 63:
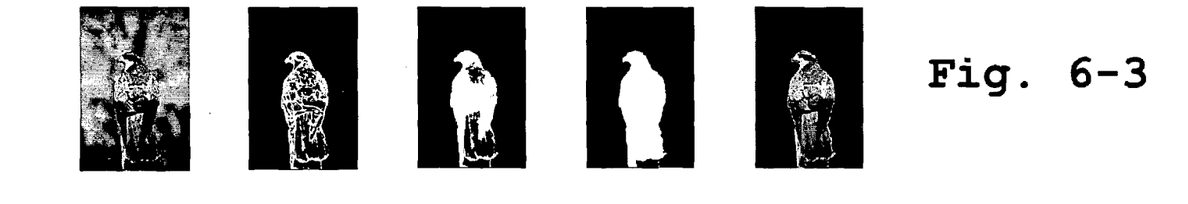
Figure 64:
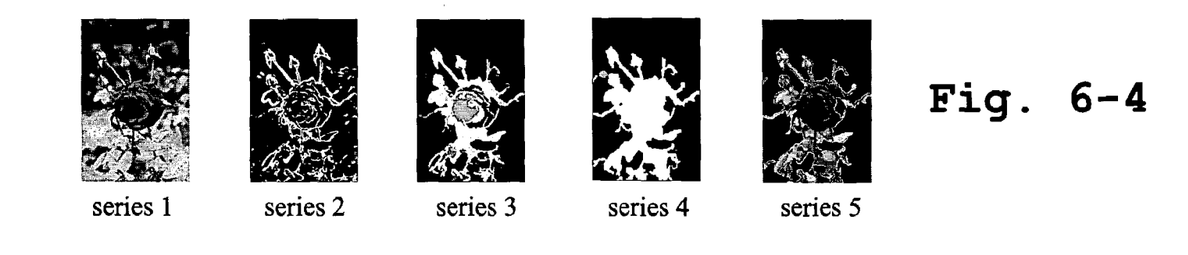
Figure 71:
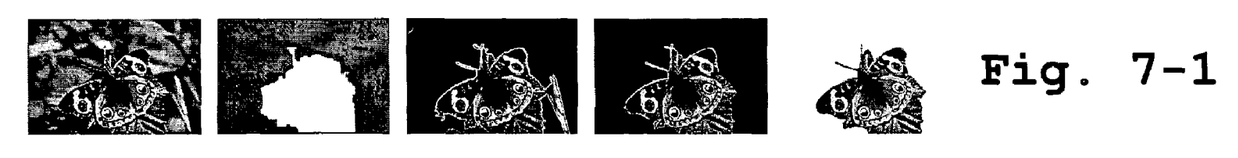
Figure 72:
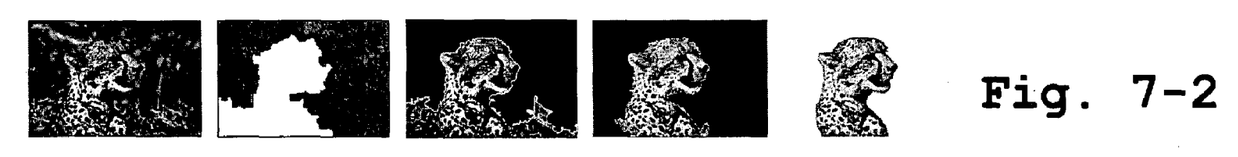
Figure 73:
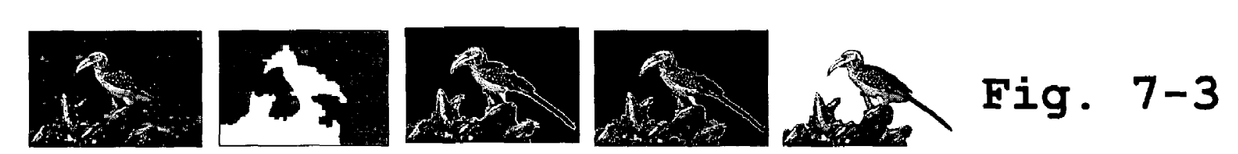
Figure 74:
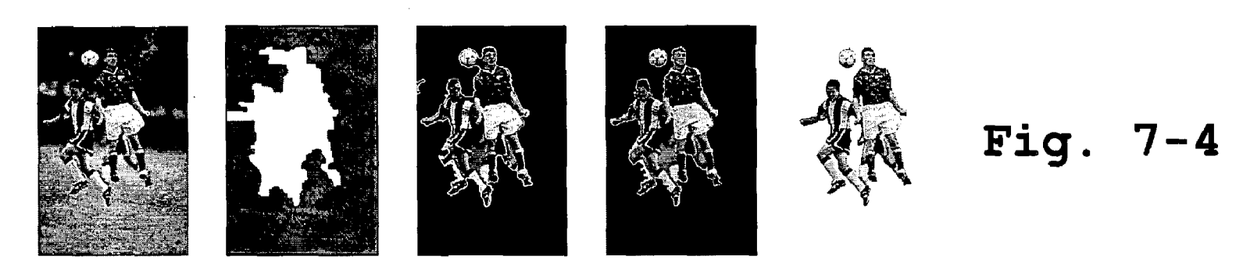

FIG. 10 is a simplified schematic diagram of an image searching system in accordance with one embodiment of the invention. Image capture device 150 is configured to capture digital image data in block 164 through lens 152. The captured digital image data may be processed on image extraction assembly 166, which is configured to extract the objects of interest of the low depth of field image. It should be appreciated that image extraction assembly 166 may be a general purpose computer in one embodiment of the invention. That is, image extraction assembly 166 performs the extraction of the object of interest according to the extraction schemes discussed herein. Image extraction assembly 166 is in communication with content retrieval system 168. Content retrieval system 168 is in communication with network 170. Thus, an image search over a distributed network may be performed based upon the extracted object of interest.

In summary, the embodiments described herein provide a method and a system that separates the pixels in the low DOF images into two regions based on their higher order statistics. The low DOF image was transformed into an appropriate feature space, which was called HOS map in this paper. Morphological filter by reconstruction was applied to simplify the HOS map. After the application of the morphological filter, a region merging technique was applied. Then adaptive thresholding is used for a final decision on a size associated with the object of interest.

It should be appreciated that by employing the powerful morphological tool for simplification, the proposed scheme performs well even for focused smooth regions as far as their boundaries contain high frequency components (i.e., edges). However, if the focused smooth region is too large, the embodiments described herein may be less effective. This impediment may be solved if the algorithm is configured to incorporate some semantic or human knowledge. It will be apparent to one skilled in the art that the proposed algorithm can be extended to video object segmentation in cooperation with the low DOF photographic technique, since extracting video objects from arbitrary video sequences is still highly challenging. Additionally, the embodiments described herein may be applied to any suitable low depth of field images where it is desired to extract an object of interest, e.g., microscopy, photography, etc.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above described invention may be practiced with other computer system configurations including hand-held devices, microprocessor systems, microprocessorbased or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data which can be thereafter read by a computer system. The computer readable medium also includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for partitioning image data, comprising:
   defining an image feature space based upon frequency information including, computing a higher order statistic (HOS), which does not include the variance, for each pixel value associated with the image feature space;
   reducing a dynamic range of HOS values by down-scaling a HOS value associated with each pixel while still maintaining gray levels associated with each HOS value, and further reducing the dynamic range of the HOS values by limiting a maximum of the HOS value associated with each pixel while still maintaining gray levels associated with each HOS value;
   filtering image data of the image feature space with morphological tools;
   assigning a region of the filtered image feature space as an initial object of interest;
   identifying a boundary of the initial object of interest of the filtered image feature space; and
   determining a size of the initial object of interest relative to an image data size.

2. The method of claim 1, wherein the method operation of identifying a boundary of the initial object of interest of the filtered image feature space includes,
   calculating a normalized overlap boundary representing a value indicating boundary pixels shared between the initial object of interest and a region bordering the initial object of interest;
   if the value is greater than a threshold value then the method includes,
      merging the region bordering the initial object of interest into the initial object of interest.

3. The method of claim 1, wherein the HOS represents a fourth order moment associated with each pixel value.

4. The method of claim 1, wherein the method operation of filtering image data of the image feature space with morphological tools includes,
   applying the morphological tools to the image data of the image feature space in a manner that preserves the boundary of the object of interest.

5. The method of claim 1 wherein the method operation of filtering image data of the image feature space with morphological tools includes,
   removing dark patches associated with focused regions of the image feature space; and
   removing bright patches associated with defocused region of the image feature space.

6. The method of claim 1, wherein the method operation of assigning a region of the filtered image feature space as an initial object of interest includes,
   identifying regions of the image feature space associated with a substantially constant frequency level; and
   assigning a value to each of the identified regions based upon the substantially constant frequency level, wherein the region of the filtered image space associated with the initial object of interest is assigned a highest value.

7. A method of image segmentation, comprising:
   generating a higher order statistic (HOS) map from image data, wherein the HOS may does not include the variance;
   reducing the dynamic range of the HOS may by down-scaling a value associated with each pixel while still maintaining gray levels associated with each pixel, and further reducing the dynamic range of the HOS may by limiting a maximum of the value associated with each pixel while still maintaining gray levels associated with each pixel;
   modifying the HOS map;
   determining a boundary associated with a focused region of the modified HOS map; and
   determining a final segmentation of the focused region based upon a size of a value associated with the focused region relative to an image data size.

8. The method of claim 7, wherein the method operation of determining a boundary associated with a focused region of the modified HOS map includes;
   determining a value indicating a shared boundary amount between the focused region and a bordering region; and
   if the value is greater than a threshold value, then the method includes,
      merging the focused region and the bordering region.

9. The method of claim 7, wherein the method operation of determining a final segmentation of the focused region based upon a size of a value associated with the focused region relative to an image data size includes, decreasing a threshold value until the size of the value associated with the focused region relative to the image data size becomes greater than about 20%.

10. The method of claim 7, wherein the focused region is an object of interest.

11. The method of claim 7, wherein the method operation of modifying the HOS map includes,
applying reconstruction by erosion to pixel values associated with the HOS map; and
applying reconstruction by dilation to the pixel values, the applying reconstruction by dilation including,
restoring contours of components associated with the HOS map.

12. The method of claim 7, wherein the method operation of determining a final segmentation of the focused region based upon a size of a value associated with the focused region relative to an image data size includes,
defining a threshold value;
determining the size of the value associated with the focused region at the threshold value; and
reducing the threshold value until the size of the value associated with the focused region is greater than about 20% the image data size.

13. The method of claim 7, further comprising:
identifying an interior of a homogenous region of the modified HOS map; and
assigning a marker to the homogenous region.

14. A method for extracting an object of interest from an image, comprising:
defining an image feature space based upon frequency information;
calculating a higher order statistic (HOS) value for each pixel value of the image, wherein the HOS value does not include the variance;
defining a HOS map from the calculated HOS values;
reducing the dynamic range of the HOS may by down-scaling a value associated with each pixel while still maintaining gray levels associated with each pixel, and further reducing the dynamic range of the HOS may by limiting a maximum of the value associated with each pixel while still maintaining gray levels associated with each pixel; and
filtering the image feature space to smooth both focused regions and defocused regions while maintaining respective boundaries associated with the focused regions and the defocused regions.

15. The method of claim 14, further comprising:
merging similar focused regions to define an object of interest (OOI); and
determining a size of the OOI relative to the image feature space.

16. The method of claim 14, wherein the method operation of filtering the image feature space to smooth both focused regions and defocused regions while maintaining respective boundaries associated with the focused regions and the defocused regions includes,
applying a morphological filter by reconstruction to the image feature space.

17. A computer readable medium having program instructions for image segmentation, comprising:
program instructions for generating a higher order statistic (HOS) map from image data, wherein the HOS may does not include the variance;
program instructions for modifying the HOS map;
program instructions for reducing the dynamic range of the HOS may by down-scaling a value associated with each pixel while still maintaining gray levels associated with each pixel, and further reducing the dynamic range of the HOS map by limiting a maximum of the value associated with each pixel while still maintaining gray levels associated with each pixel;
program instructions for determining a boundary associated with a focused region of the modified HOS map; and
program instructions for determining a final segmentation of the focused region based upon a size of a value associated with the focused region relative to an image data size.

18. The computer readable medium of claim 17, wherein the program instructions for generating a higher order statistic (HOS) map from image data includes,
program instructions for scaling value associated with each pixel; and
program instructions for limiting a maximum of the value associated with each pixel.

19. The computer readable medium of claim 17, wherein the program instructions for determining a boundary associated with a focused region of the modified HOS map includes;
program instructions for determining a value indicating a shared boundary amount between the focused region and a bordering region; and
program instructions for merging the focused region and the bordering region if the value is greater than a threshold value.

20. The computer readable medium of claim 17, wherein the program instructions for determining a final segmentation of the focused region based upon a size of a value associated with the focused region relative to an image data size includes,
program instructions for decreasing a threshold value until the size of the value associated with the focused region relative to the image data size becomes greater than 20%.

21. The computer readable medium of claim 17, wherein the program instructions for modifying the HOS map includes,
program instructions for applying reconstruction by erosion to pixel values associated with the HOS map;
program instructions for applying reconstruction by dilation to the pixel values, the program instructions for applying reconstruction by dilation including,
program instructions for restoring contours of components associated with the HOS map.

22. The computer readable medium of claim 17, further comprising:
program instructions for identifying an interior of a homogenous region of the modified HOS map; and
program instructions for assigning a marker to the homogenous region.

* * * * *